United States Patent [19]

Belcher

[11] Patent Number: 4,756,536
[45] Date of Patent: Jul. 12, 1988

[54] BRUSH SEAL
[75] Inventor: Bryan L. Belcher, Leamington Spa, England
[73] Assignee: Rolls-Royce plc, London, England
[21] Appl. No.: 109,089
[22] Filed: Oct. 14, 1987
[30] Foreign Application Priority Data
    Dec. 6, 1986 [GB] United Kingdom ............... 8629218
[51] Int. Cl.⁴ ............................................. F16J 15/447
[52] U.S. Cl. ......................................... 277/53; 277/59; 277/79
[58] Field of Search ............................. 277/53–57, 277/58, 59, 71, 72 R, 72 FM, 79

[56] References Cited

U.S. PATENT DOCUMENTS

| 885,032 | 4/1908 | De Ferranti | 277/53 X |
| 1,773,067 | 8/1930 | Ver Planck | 277/53 X |
| 1,779,076 | 10/1930 | Ray | 277/53 X |
| 2,543,615 | 2/1951 | Trumpler | 277/53 X |

FOREIGN PATENT DOCUMENTS 2274 of 1909 United Kingdom ............... 277/56

Primary Examiner—Robert S. Ward
Attorney, Agent, or Firm—Cushman, Darby & Cushman

[57] ABSTRACT

A brush seal operationally located between a rotatable shaft and static structure comprises a number of stages. The seal stage adjacent a region of low fluid pressure and its adjacent stage are spaced apart by an apertured ring. The apertures in the ring being so dimensioned as to vent pressurized fluid from the chamber and thereby reduce the magnitude of the pressure differential across the seal stage adjacent the region of low fluid pressure.

7 Claims, 1 Drawing Sheet

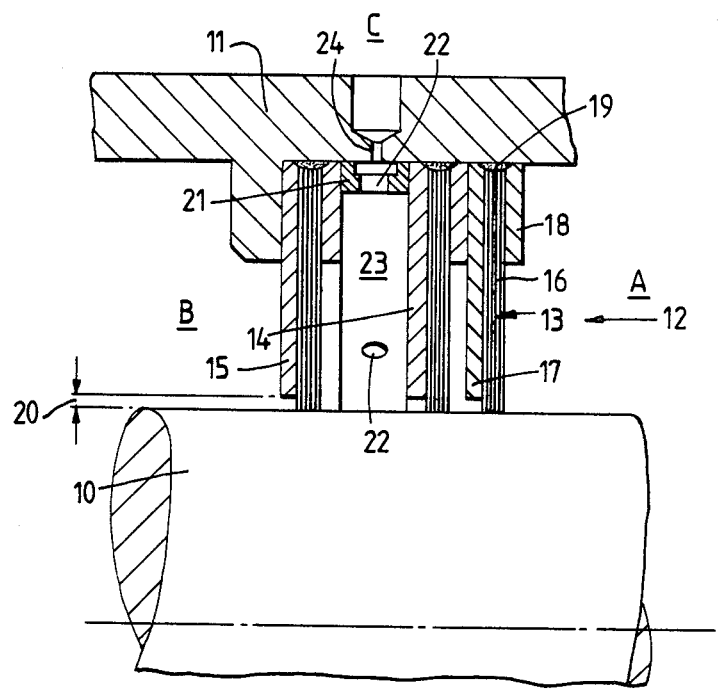

BRUSH SEAL

This invention relates to brush seals.

It is known to use a brush seal to establish a fluid seal between relatively movable components. Typically the seal comprises a plurality of filaments which are fixed to one of the components and in sliding relationship with the other component. For instance, the seal may be annular and positioned between a rotatable shaft and static structure surrounding the shaft. The seal filaments in such an application would usually be bonded to the static structure and generally radially inwardly directed to that they engage the shaft in sliding relationship.

If the pressure differential across the seal is high, it is usual to add additional brush seal stages in series relationship so that the pressure differential across each seal stage is of an acceptable level. The drawback with this approach however is that the pressure differential across the last seal is always the largest and so it is this stage which is prone to excessive leakage. The usual solution to this problem is to add further brush seal stages until an acceptable level of sealing is achieved. However the drawback with this approach is that the reduction in the final stage pressure differential progressively diminishes as further stages are added. Thus although the level of effectiveness of the total seal may eventually become acceptable, a large number of seal stages will have had to have been added. This is undesirable from a cost point of view in light of the high cost of brush seal stages and also may bring about problems of installation if the space available for the seal is limited.

It is an object of the present invention to provide a brush seal which has improved performance in situations in which it is exposed to large fluid pressure differentials.

According to the present invention, a brush seal to be interposed between regions of high and low fluid pressure and between relatively movable members comprises two or more seal stages in series relationship, said regions of high and low fluid pressure relationship with respect to said regions of high and low fluid pressure, each stage comprising a plurality of filaments adapted in operation to be in fixed relationship with the other of said members, the stage operationally adjacent the region of low pressure being spaced apart from its adjacent stage to define a chamber, means being provided to vent fluid from said chamber at a rate which ensures that the fluid pressure differential across said stage adjacent said low pressure region is within the operational capabilities of said stage.

The invention will now be described, by way of example, with reference to the accompanying drawing which is a sectioned side view of a brush seal in accordance with the present invention.

With reference to the drawing, a rotatable shaft 10 is coaxially surrounded by an annular static structure 11 and a brush seal, generally indicated at 12 is positioned between them. The region A to the right of the seal 12 as viewed in the drawing contains fluid, which may for instance be air, which is at a higher pressure than fluid which is in the region B to the left of the seal 12, again as viewed in the drawing.

The fluid pressure differential between the regions A and B is greater than that which is within the sealing capabilities of a single stage brush seal. This being so, the brush seal 12 is constituted by three similar brush seal stages 13, 14 and 15 which are arranged in series relationship. Each brush seal stage 13, 14 and 15 is bonded, by for instance brazing, to the static structure 11 and comprises an annular array of generally radially extending metallic filaments 16 which are sandwiched between a backing ring 17 and a side plate 18. The filaments 16 of each seal element 13, 14 and 15 are bonded, again by, for instance brazing, at their radially outer extends 19, to their respective backing ring 17 and side plate 18.

The backing rings 17 and side plates 18 are of the same external diameter but their internal diameters differ so that backing ring 17 adjacent the higher fluid pressure side of each seal element 13, 14 and 15 is of greater internal diameter than the side plate 18 adjacent the lower fluid pressure side. In fact the radial clearance 20 between each backing ring 17 and the shaft 10 is arranged to be as small as possible while avoiding physical contact with the shaft 10.

The pressure differential across the seal stage 15 adjacent the region of low fluid pressure is the greatest of the three stages 13, 14 and 15 and thus it is this stage 15 which is most prone to ineffective operation leading to an increase in the leakage of fluid pressure to the fluid pressure region B. In order to reduce the fluid pressure differential across the seal stage 15, it is radially spaced apart from its adjacent seal stage 14 by an apertured spacer ring 21. The spacer ring 21 is located adjacent the static structure 11 and is provided with a plurality of apertures 22 which interconnect the annular chamber 23 so defined between the seal stages 14 and 15 with corresponding apertures 24 provided in the static structure 11. The apertures 24 in the static structure 11 exhaust into a region C which is at a lower fluid pressure than that within the annular chamber 23 so that the pressure differential across the seal element 15 is reduced, thereby enhancing its sealing effectiveness. Obviously the size and number of the apertures 22 and 24 in the spacer ring 22 and static structure 11 respectively are chosen so that an appropriate pressure differential exists across the seal stage 15.

Although the annular chamber 23 is described as exhausting into the region C, it will be appreciated that in certain circumstances, it may be desirable to exhaust it into the region B.

In a typical application of a seal of the type described above in gas turbine engine, the region A could contain air at a pressure of 210,000 Kg/m$^2$ and the region B could contain air at a pressure of 30 Kg/m$^2$ giving an overall pressure drop of 180,000 Kg/m$^2$. The maximum permissible clearance 20 between the locking ring 17 and the shaft 10 would be 1.25 mm and such a clearance would limit the maximum pressure differential across the seal stage 15 to about 100,000 Kg/m$^2$. However in the brush seal 12 without the apertured spacer ring 21, the pressure differential across the seal stage 15 would be 115,000 Kg/m$^2$, that is some 15,000 Kg/m$^2$ above the operational capability of the seal stage 15 and this would normally necessitate the provision of an additional seal stage. However by incorporating the apertured spacer ring 21 into the brush seal 12, the pressure differential across the seal stage 15 may be reduced to 70,000 Kg/m$^2$, well within its operational capabilities. A further advantage in reducing the pressure differential across the seal stage 15 is that the clearance 20 may be increased to around 1.5 mm.

I claim:

1. A brush seal to be interposed between regions of high and low fluid pressure and between relatively movable members comprising at least two seal stages in series relationship with respect to said regions of high and low fluid pressure, each stage comprising a plurality of filaments adapted, in operation to be in fixed relationship with one of said members and in sliding relationship with the other of said members, the stage operationally adjacent the region of low pressure being spaced apart from its adjacent stage to define a chamber, means being provided to vent fluid from said chamber at a rate which ensures that the fluid pressure differential across said stage adjacent said low pressure region is within the operational capabilities of said stage.

2. A brush seal is claimed is claim 1 wherein said means provided to vent fluid from said chamber comprises a spacer member adapted to space apart said stage operationally adjacent said region of low pressure and the stage adjacent thereto, said spacer having apertures therein to facilitate said venting.

3. A brush seal as claimed in claim 2 wherein said spacer member is operationally adjacent one of said relatively movable members, said apertures in said spacer member being aligned with corresponding vent apertures in said member.

4. A brush seal as claimed in claim 1 wherein said brush seal is annular.

5. A brush seal is claimed in claim 4 wherein said brush seal is adapted to be operationally interposed between a rotatable shaft and static structure surrounding said shaft, and fixedly attached to said static structure.

6. A brush seal as claimed in claim 1 wherein each seal stage comprises a plurality of filaments, a backing member and a side plate, the filaments being sandwiched between and retained by the backing member and side plate.

7. A brush seal as claimed in claim 6 wherein said filaments are metallic.

* * * * *